(12) United States Patent
Bodine et al.

(10) Patent No.: US 10,585,407 B2
(45) Date of Patent: Mar. 10, 2020

(54) HOME APPLIANCE AND METHOD OF OPERATING A HOME APPLIANCE

(71) Applicant: WHIRLPOOL CORPORATION, Benton Harbor, MI (US)

(72) Inventors: Darryl C. Bodine, Saint Joseph, MI (US); Donald E. Erickson, Stevensville, MI (US); Michelle K. Flachs, Saint Joseph, MI (US); Terry K. Litaker, Watervliet, MI (US); Chris W. Paraskevopoulos, Sterling, VA (US); Scott Albright, Buchanan, MI (US); Robert Blake, Three Oaks, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 214 days.

(21) Appl. No.: 15/595,351

(22) Filed: May 15, 2017

(65) Prior Publication Data
US 2017/0248926 A1    Aug. 31, 2017

Related U.S. Application Data

(63) Continuation of application No. 13/940,320, filed on Jul. 12, 2013, now abandoned.

(51) Int. Cl.
| | | |
|---|---|---|
| G05B 19/18 | (2006.01) | |
| G05B 15/02 | (2006.01) | |
| D06F 39/14 | (2006.01) | |
| D06F 33/02 | (2006.01) | |
| D06F 29/00 | (2006.01) | |

(52) U.S. Cl.
CPC ............. *G05B 15/02* (2013.01); *D06F 33/02* (2013.01); *D06F 39/14* (2013.01); *G05B 19/182* (2013.01); *A47L 2501/00* (2013.01); *D06F 29/005* (2013.01)

(58) Field of Classification Search
CPC ............... A47B 88/457; A47L 2501/00; A47L 2501/22; D06F 29/005; D06F 33/02; D06F 39/14; E05Y 2900/312; G05B 15/02; G05B 19/182; G06F 3/011
See application file for complete search history.

(56) References Cited

U.S. PATENT DOCUMENTS

| | | | |
|---|---|---|---|
| 2,219,821 A | 10/1940 | Schonitzer | |
| 3,714,737 A * | 2/1973 | Fillion | E05F 15/57 49/139 |
| 4,894,952 A | 1/1990 | Trett et al. | |
| 5,546,773 A | 8/1996 | Lee | |
| 5,724,837 A | 3/1998 | Shin | |
| 5,838,125 A | 11/1998 | Choi | |
| 5,870,787 A | 2/1999 | Choi | |
| 6,783,167 B2 | 8/2004 | Koops et al. | |
| 7,538,506 B2 | 5/2009 | Zinn et al. | |
| 7,781,995 B2 | 8/2010 | Yang et al. | |

(Continued)

*Primary Examiner* — Michael J Huntley
(74) *Attorney, Agent, or Firm* — McGarry Bair PC

(57) ABSTRACT

A home appliance for treating an article according to an automatic cycle of operation, includes a treating chamber having an open face, a door for closing the open face of the treating chamber, two or more sensors on a housing of the home appliance, an actuator operably coupled with the door to move the door from a closed position of the door to an opened position of the door, and a controller.

20 Claims, 8 Drawing Sheets

(56) References Cited

U.S. PATENT DOCUMENTS

| | | |
|---|---|---|
| 8,217,611 B2 | 7/2012 | Ennis |
| 2003/0132974 A1 | 7/2003 | Bodin |
| 2006/0086154 A1* | 4/2006 | Kim ................ D06F 39/14 68/196 |
| 2007/0132552 A1 | 6/2007 | Kurpinski et al. |
| 2008/0143559 A1 | 6/2008 | Dietz et al. |
| 2008/0210268 A1 | 9/2008 | Metheny et al. |
| 2009/0160211 A1 | 6/2009 | Krishnan et al. |
| 2009/0300988 A1 | 12/2009 | Bem |
| 2010/0295773 A1* | 11/2010 | Alameh ............ H03K 17/9631 345/156 |
| 2011/0118946 A1 | 5/2011 | Reimann et al. |
| 2011/0139772 A1* | 6/2011 | Darney .............. E05B 47/0002 219/702 |
| 2011/0153362 A1 | 6/2011 | Valin et al. |
| 2011/0260553 A1 | 10/2011 | Poyner et al. |
| 2012/0055091 A1 | 3/2012 | Backherms et al. |
| 2012/0153787 A1* | 6/2012 | Busalt ................ F24C 15/02 312/236 |
| 2012/0163723 A1 | 6/2012 | Balan et al. |
| 2012/0312956 A1* | 12/2012 | Chang ................ G06F 3/017 250/201.1 |
| 2013/0042432 A1 | 2/2013 | Andrews et al. |
| 2013/0099715 A1 | 4/2013 | Fuhge |
| 2013/0145692 A1* | 6/2013 | Laird ................ E05F 15/73 49/31 |
| 2013/0261871 A1* | 10/2013 | Hobbs ................ B60K 37/06 701/28 |
| 2014/0157209 A1* | 6/2014 | Dalal ................ G06F 3/017 715/863 |
| 2015/0002386 A1* | 1/2015 | Mankowski ........... G06F 3/017 345/156 |
| 2015/0012176 A1* | 1/2015 | Schindler ............. B60W 50/08 701/36 |
| 2015/0317516 A1 | 11/2015 | Tsoref et al. |

* cited by examiner

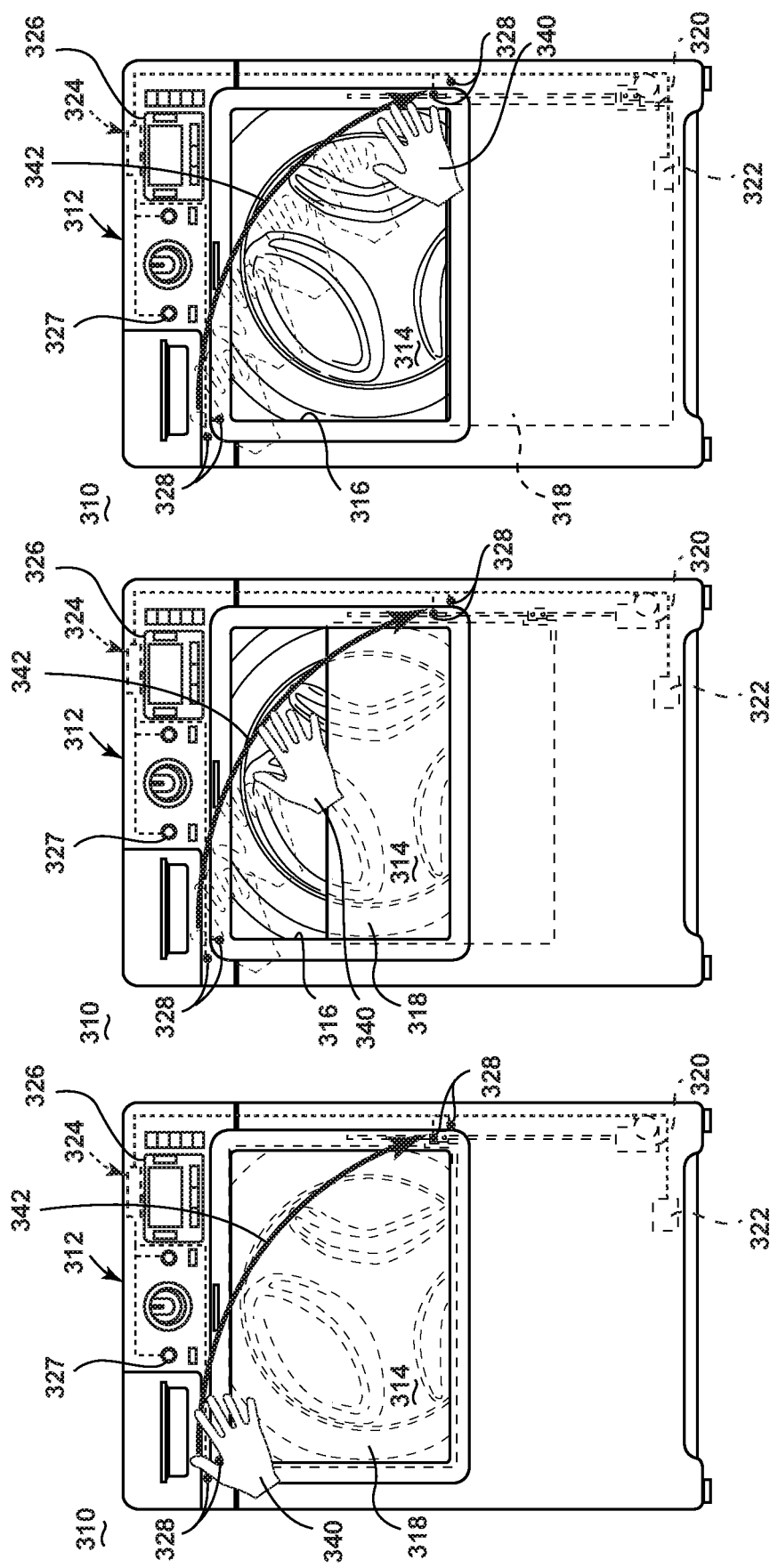

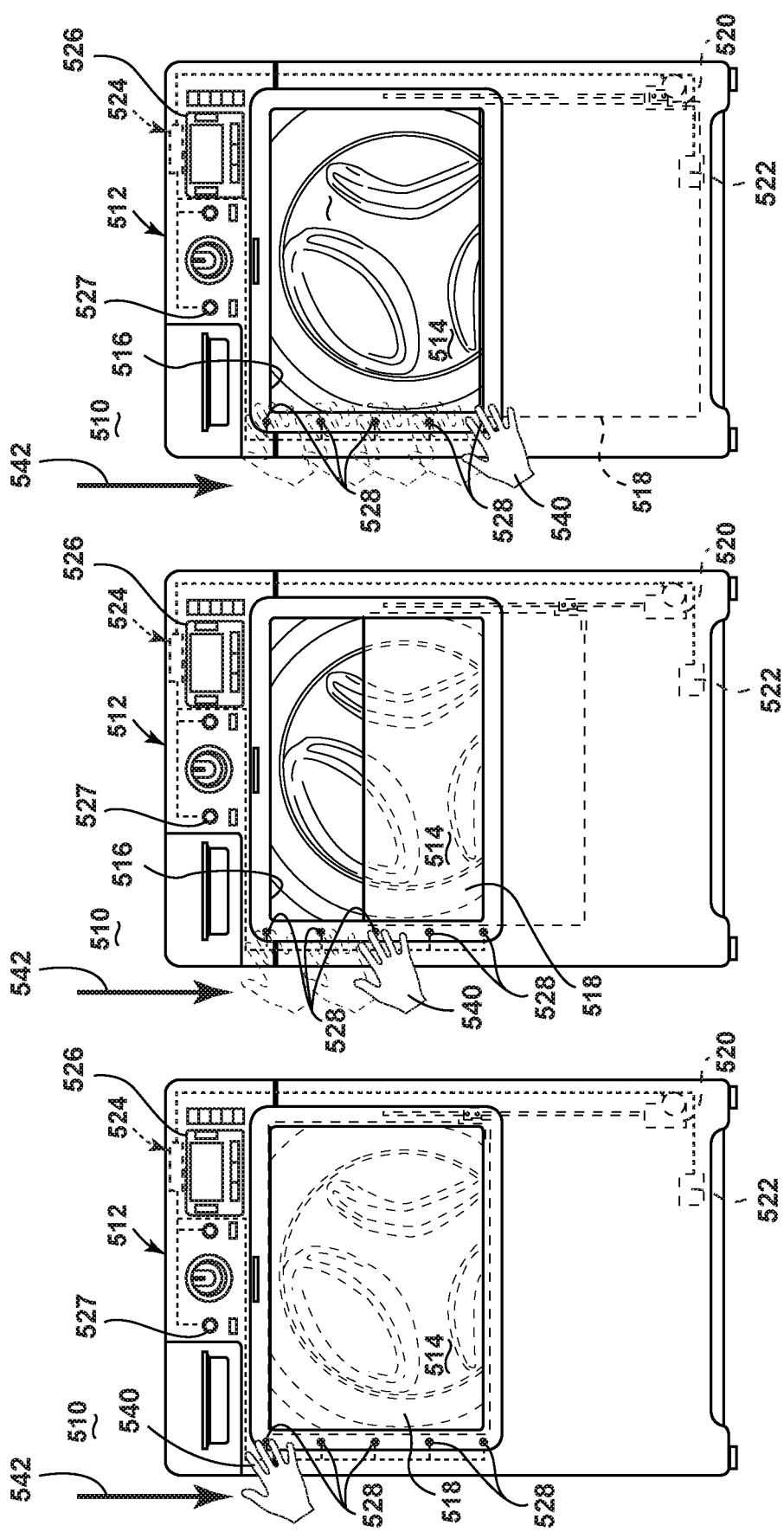

HOME APPLIANCE AND METHOD OF OPERATING A HOME APPLIANCE

CROSS REFERENCE TO RELATED APPLICATIONS

This application is a continuation of U.S. patent application Ser. No. 13/940,320, filed Jul. 12, 2013, which is hereby incorporated by reference in its entirety.

BACKGROUND OF THE INVENTION

Home appliances perform a variety of cycles of operation on various articles. More specifically, a home appliance may include a treating chamber for receiving an article for treatment according to an automatic cycle of operation. The treating chamber may have an open face selectively closeable by a door.

BRIEF DESCRIPTION OF THE INVENTION

In one aspect, the invention relates to a home appliance for treating an article according to an automatic cycle of operation, including a treating chamber having an open face, a door for slidably closing the open face of the treating chamber in a vertical direction, two or more sensors vertically arranged on a housing of the home appliance, at least a first of the two or more sensors disposed vertically above or vertically below a second of the two or more sensors, an actuator operably coupled with the door to vertically move the door from a closed position of the door to an opened position of the door, and a controller for controlling operation of the home appliance. The controller is configured to receive a first signal from the first of the two or more sensors, receive a subsequent signal from the second of the two or more sensors, determine that a predetermined gesture in a vertical direction has been made by the user based on the received signals, and actuate the actuator to slide the door vertically.

BRIEF DESCRIPTION OF THE DRAWINGS

In the drawings:

FIGS. 7A-7C illustrate movement of a door of the home appliance of FIG. 5.

FIGS. 8A-8C illustrate movement of a door of yet another home appliance.

DESCRIPTION OF EMBODIMENTS OF THE INVENTION

Figure 1:
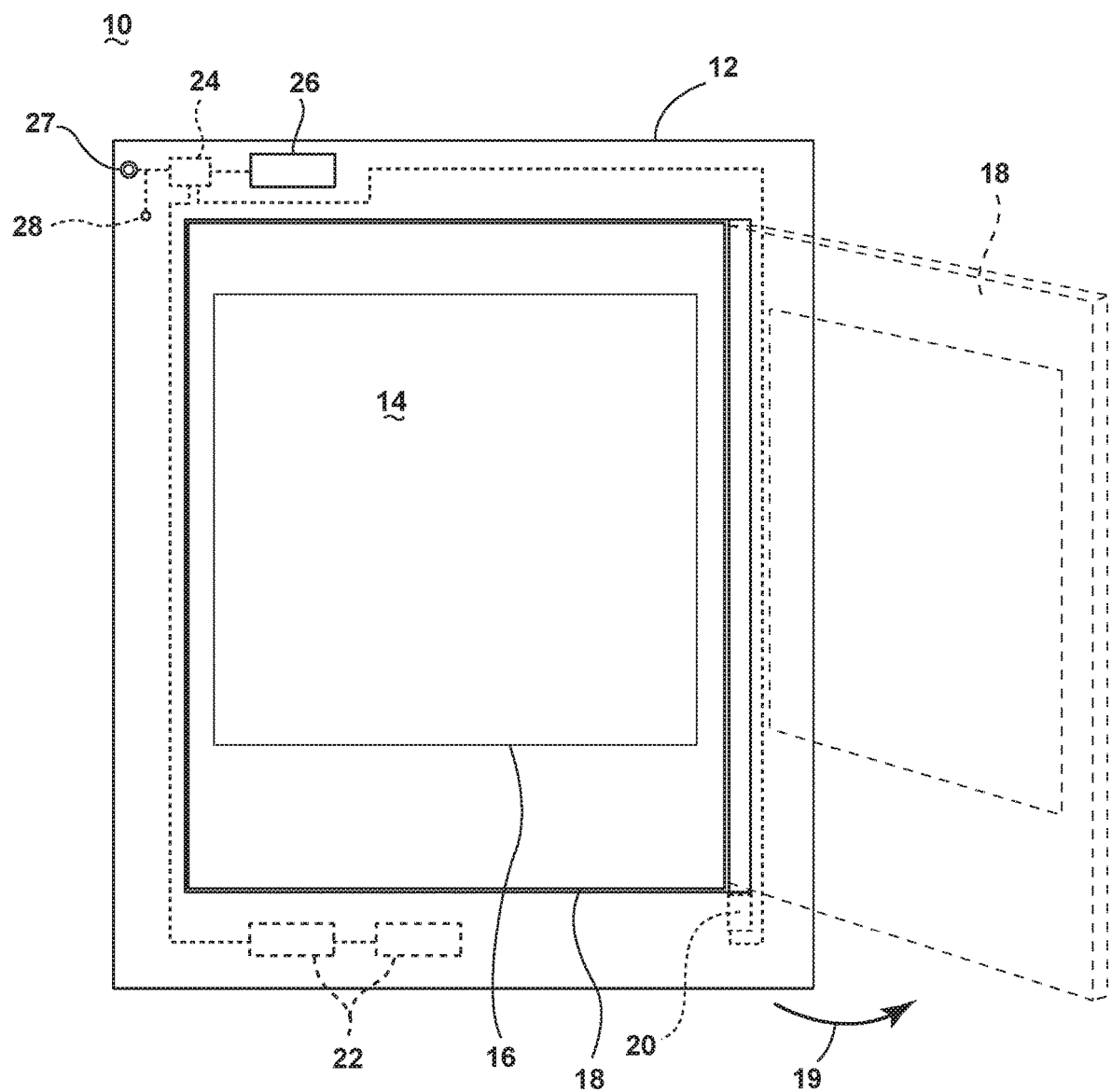
FIG. 1 is a schematic view of a home appliance.

FIG. 1 is a schematic view of a home appliance 10, which may be used to implement embodiments of the invention. The home appliance 10 includes a housing 12 that may house a treating chamber 14 for receiving an article for treatment according to an automatic cycle of operation. The housing 12 may include a cabinet, unitary or not, as well as a frame or chassis, which may or may not have panels attached to it. The treating chamber 14 may include an open face 16 that may be selectively closed by a door 18. More specifically, the door 18 may be movably mounted to the housing 12 to selectively close the treating chamber 14. The door 18 has been illustrated as being in an opened position, shown in phantom, and a closed position. The door 18 has been illustrated as moving in a pivoting manner to close the open face 16. The arrow 19 indicates the direction the door 18 moves when it moves in an open direction.

An actuator 20 may be operably coupled with the door 18 to move the door 18 through the various operational positions, e.g. opened and closed, of the door. The actuator 20 may also be configured to automatically move the door 18, which may be in response to a predetermined condition. For example, the actuator 20 may move the door 18 from a closed position of the door 18 to an opened position of the door 18. This may include that the actuator 20 may move the door 18 to a partially opened position or a fully opened position. The actuator 20 may also be configured to move the door 18 towards a closed position including that the actuator 20 may close the door 18. The actuator 20 may move the door 18 in response to input from a control system of the home appliance 10. The actuator 20 may be any suitable type of actuator 20 operably coupled with the door 18 to move the door 18 including that the actuator 20 may include a motor operably coupled with the door 18 or a biasing device, such as a spring. For example, in the case of a motor, the motor may be configured to move the door 18 to an opened position where the door 18 may be fully open. The motor may also be configured to move the door 18 from the opened position to the closed position. By way of further example, in the case of a spring, the spring may be configured to move the door 18 to an opened position including that of a partially opened position. While the actuator 20 has been shown being positioned below the door 18, it will be understood that the actuator 20 may be located in any suitable location.

One or more components 22 may be included in the home appliance 10 and such components 22 may be controlled by a controller 24 to execute the cycle of operation. The home appliance 10 may be any suitable home or domestic appliance that performs a particular job in a home, including those relating to cleaning, cooking, or food preservation. While the appliance 10 has been illustrated generically, the home appliance may be any suitable home appliance, including, but not limited to a dishwasher, a refrigerator, a freezer, a range, a stove, an oven, a cooktop, a clothes washing machine, a clothes dryer, a combination washing machine and dryer, a dispensing dryer, a tumbling or stationary refreshing/revitalizing machine, an extractor, a non-aqueous washing apparatus, a revitalizing machine, etc. All of these examples of home appliances may receive one or more article(s) and may include any number of components 22 that may be controlled so that the home appliance 10 may perform a useful cycle of operation on the article(s).

The control system may control the operation of the home appliance 10 to implement one or more cycles of operation. The control system may include the controller 24 and a user interface 26 that may be operably coupled with the controller 24. The user interface 26 may include one or more knobs, dials, switches, displays, touch screens, and the like for communicating with the user, such as to receive input and provide output. The user may enter different types of information including, without limitation, cycle selection and cycle parameters, such as cycle options. Furthermore, other user inputs that are separate from the user interface 26 may be included. For example, a button 27 may be included and may be operably coupled with the actuator 20 and the controller 24 to prompt operation of the actuator 20 upon a user selecting the button 27. More specifically, when the button 27 may be pressed by a user the door 18 may be opened or closed depending on its current position.

The controller 24 may include the machine controller and any additional controllers provided for controlling any of the components 22 of the home appliance 10. For example, the controller 24 may include the machine controller and a motor controller. Many known types of controllers may be used for the controller 24. The specific type of controller is not germane to the invention. It may be contemplated that the controller may be a microprocessor-based controller that implements control software and sends/receives one or more electrical signals to/from each of the various working components to effect the control software. As an example, proportional control (P), proportional integral control (PI), and proportional derivative control (PD), or a combination thereof, a proportional integral derivative control (PID control), may be used to control the various components.

Figure 2:
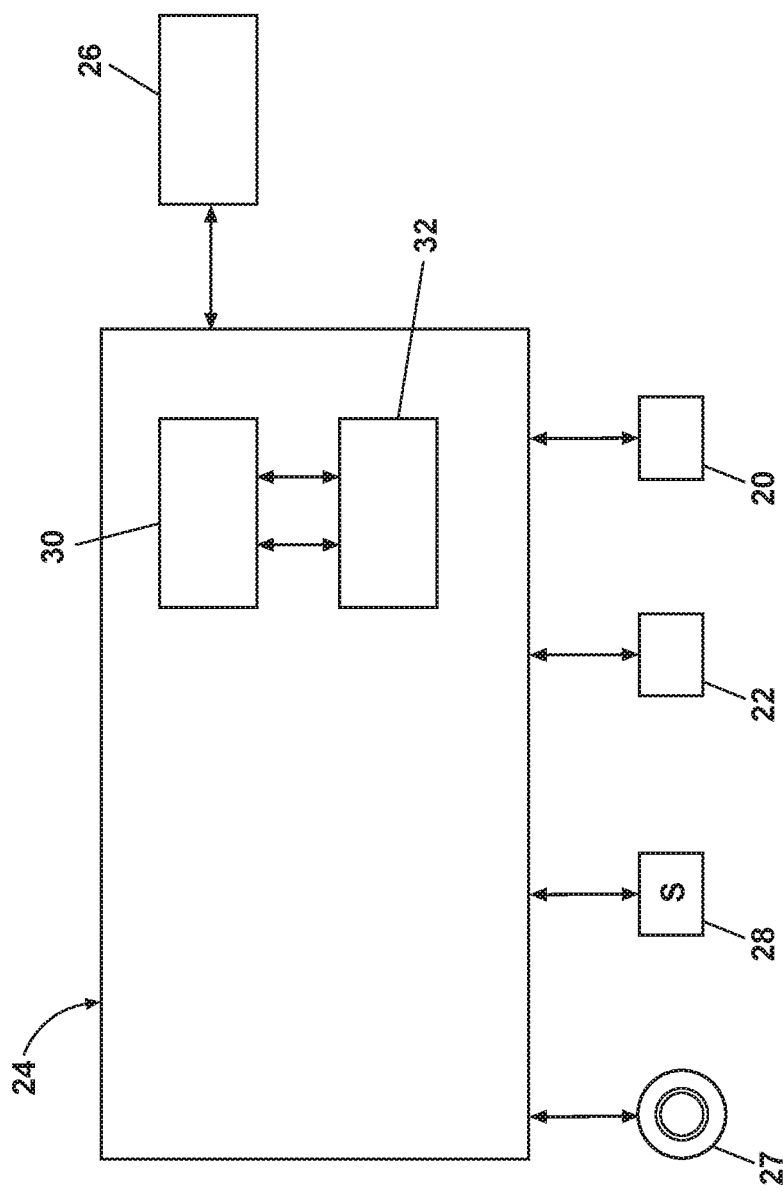
FIG. 2 is a schematic of a control system of the home appliance of FIG. 1.

As illustrated in FIG. 2, the controller 24 may be provided with a memory 30 and a general purpose central processing unit (CPU) 32. The memory 30 may be used for storing the control software, such as a set of computer-executable instructions, that may be executed by the CPU 32 in completing a cycle of operation using the home appliance 10 and any additional software. The controller 24 may be operably coupled with one or more components 22 of the home appliance 10 for communicating with and controlling the operation of the component 22 to complete a cycle of operation.

The controller 24 may also be coupled with one or more sensors 28 to receive input from the sensors. In one example, a sensor 28 may be included in the home appliance 10 and may be configured to sense a user at a predetermined location with respect to the home appliance 10 and provide a signal based thereon. Any suitable sensor 28 may be utilized including a proximity sensor, other non-contact sensor, or even a combination of contact sensors and non-contact sensors etc. For example, the sensor 28 may include a capacitive sensor, a capacitive displacement sensor, an inductive sensor, a laser rangefinder sensor, an infrared sensor, a photoelectric sensor, a radar sensor, a reflection sensor, an ultrasonic sensor, etc. The sensor 28 may be configured to provide any suitable signal to the controller 24 including a digital signal indicating a user may be within a predetermined range of positions with respect to the home appliance 10. The controller 24 may use the signal output from the sensor 28 and may actuate the actuator 20 based thereon. For example, in operation, when a user may be sensed as being within a predetermined range from the sensor 28, the controller 24 may activate the actuator 20 to open the door 18.

Figure 3:
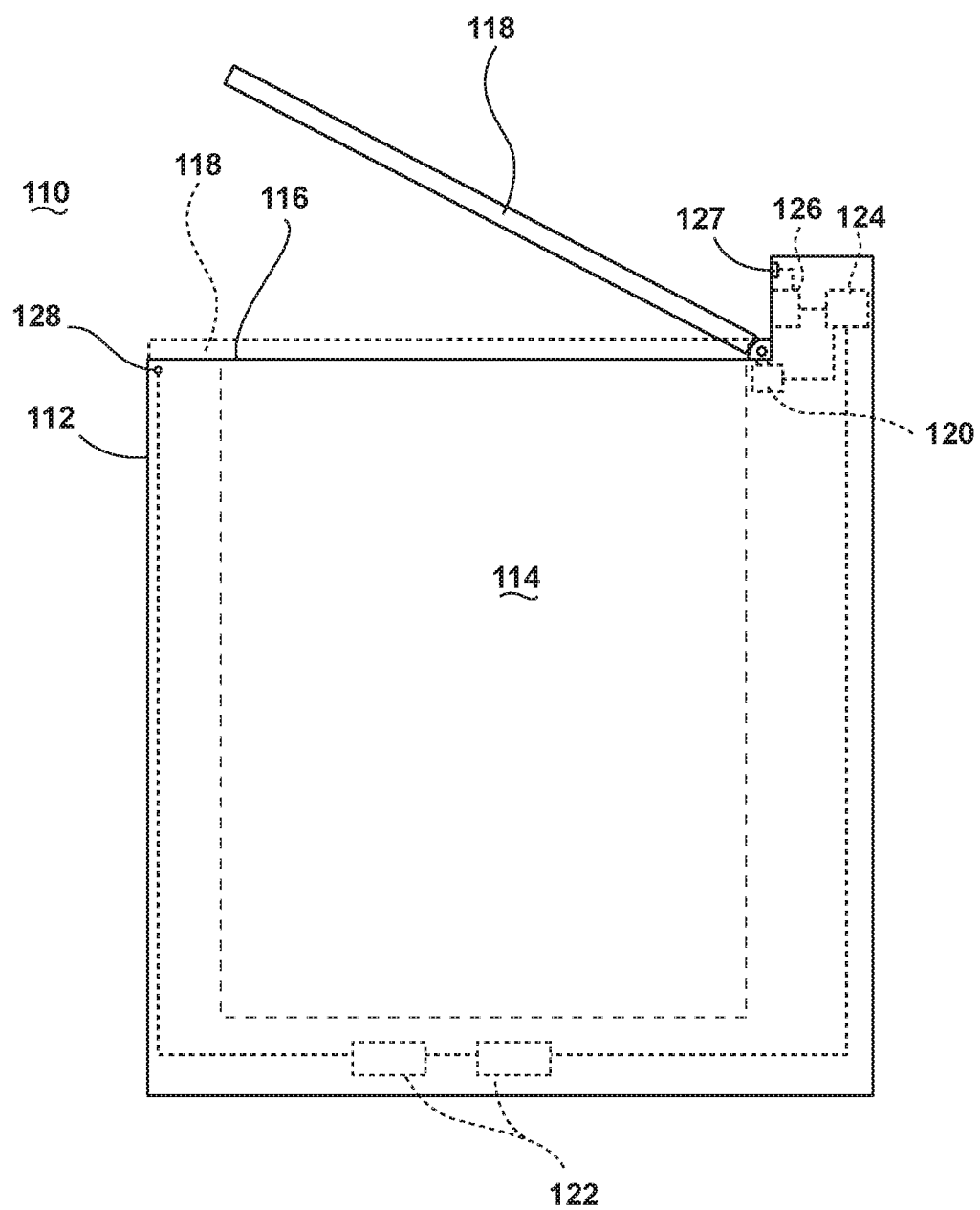
FIG. 3 is a schematic view of another home appliance.

FIG. 3 is a schematic view of another home appliance 110 having a vertically pivoting door 118. The home appliance 110 is similar to the home appliance 10 previously described and therefore, like parts will be identified with like numerals increased by 100, with it being understood that the description of the like parts of the home appliance 10 applies to the home appliance 110, unless otherwise noted. In the home appliance 110 the door 18 may pivot vertically with respect to the home appliance 110. The door 118 has been shown in a closed position, in phantom, and a partially opened position. The door 118 may be further pivoted upwards to a fully opened position. During operation, the sensor 128 may sense a user at a predetermined location with respect to the home appliance 110 and provide a signal based thereon and the controller 124 may use the signal output from the sensor 128 and may actuate the actuator 120 to vertically pivot open the door 118 to either a partially opened position or a fully opened position.

Figure 4:
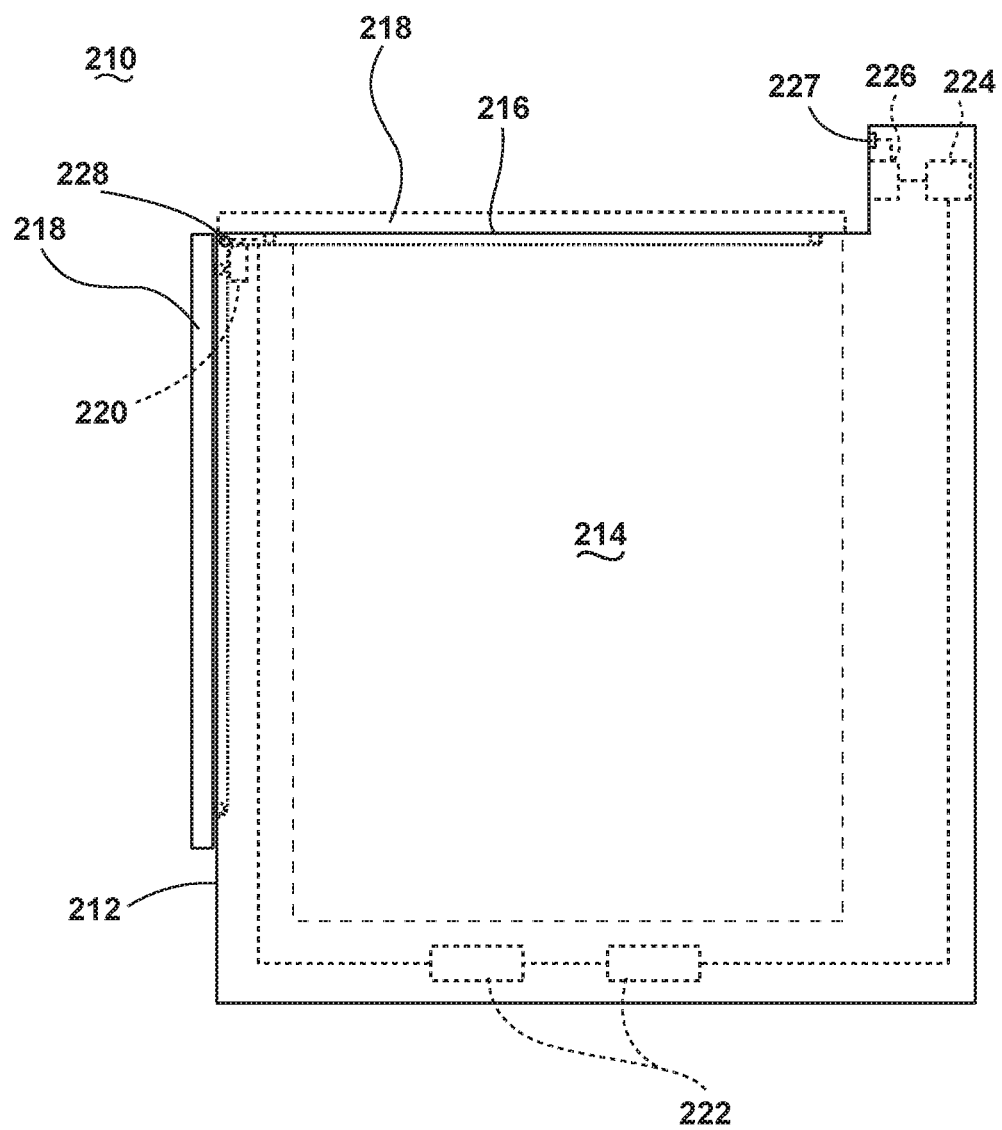
FIG. 4 is a schematic view of another home appliance.

FIG. 4 is a schematic view of yet another home appliance 210. The home appliance 210 is similar to the home appliance 10 previously described and therefore, like parts will be identified with like numerals increased by 200, with it being understood that the description of the like parts of the home appliance 10 applies to the home appliance 210, unless otherwise noted. One difference is that instead of having a door that opens and closes in a pivoting manner, the door 218 moves in a sliding manner to open and close the open face 216 of the treating chamber 214. For example, the door 218 is illustrated in a closed position at the top of the home appliance 210, in phantom, and in an opened position where it has been slid along an outside of the housing 212 to a front portion of the home appliance 210. It will be understood that the door 218 may be slid in any suitable manner including through the use of tracks, etc. and that the actuator 220 may include any suitable mechanism for sliding the door 218. While the door 218 is illustrated as a single piece, it will be understood that the door 218 may comprise multiple pieces, which may be connected to form an articulating door. Further, the door 218 may be slid in any suitable direction to open and close the open face 216 of the treating chamber 214 including that the door 218 may be slid sideways, backwards, or upwards.

Figure 5:
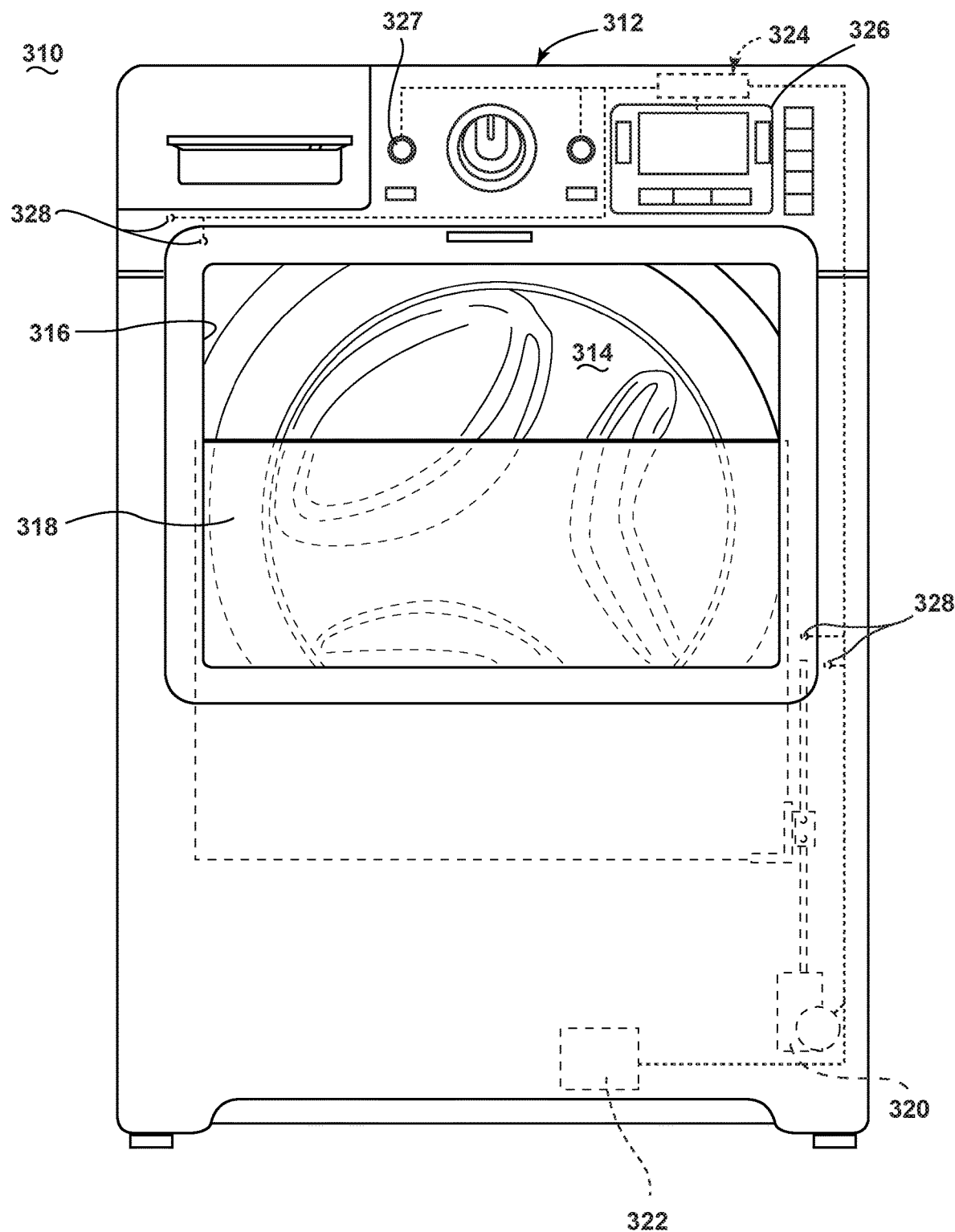
FIG. 5 is a schematic view of yet another home appliance.

FIG. 5 is a schematic view of yet another home appliance 310. The home appliance 310 is similar to the home appliance 210 previously described and therefore, like parts will be identified with like numerals increased by 100, with it being understood that the description of the like parts of the home appliance 210 applies to the home appliance 310, unless otherwise noted. One difference is the home appliance 310 has been illustrated in the form of a clothes washer. Further, the door 318 has been illustrated as a sliding door 318 that slides within a portion of the housing 312. The sliding door 318 may include a see through panel or window. It is contemplated that the sliding door may include multiple sliding panels including an outer panel that may be configured to protect the user from motion of a drum of the home appliance 310 and an inner panel that seals the treating chamber 314. Yet another difference is that multiple sensors 328, configured to sense a user at a predetermined location, have been included in the home appliance 310. This may allow the home appliance 310 to determine a presence of a user when the user is located at various locations near the home appliance 310. This may also allow the home appliance 310 to sense a movement of the user between two or more predetermined locations on the housing 312 to determine a presence of the user.

Figure 6:
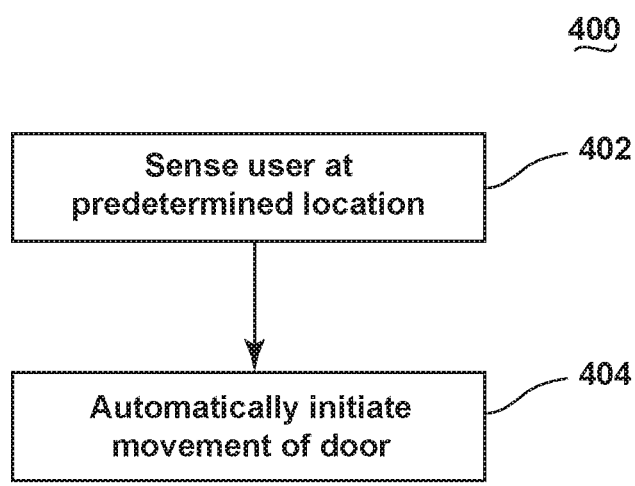
FIG. 6 is a flow chart of a method of operating a home appliance.

Regardless of the type of home appliance and its specific sensors and actuators, each home appliance described above provides the structure necessary for the implementation of embodiments of a method of invention. Referring now to FIG. 6, a flow chart of a method 400 for operating a laundry treating appliance, such as the home appliance 10, home appliance 110, home appliance 210, or home appliance 310, is illustrated. The sequence of steps depicted for this method is for illustrative purposes only, and is not meant to limit the method in any way as it is understood that the steps may proceed in a different logical order or additional or intervening steps may be included without detracting from the invention. The method 400 may be implemented in any suitable manner, such as automatically or manually, as a stand-alone phase or cycle of operation or as a phase of an operation cycle of the home appliance. While the method 400 may be utilized with any suitable home appliance, the method 400 will be described with respect to the home appliance 310 for ease of explanation.

At 402, a presence of a user at a predetermined location with respect to the home appliance 310 may be sensed, such as by one or more of the sensors 328. The predetermined location may be within a predetermined distance range from the home appliance 310. Sensing the user may include sensing a body part of the user at the predetermined location. This may also include sensing a gesture made by the user at the predetermined location, which may include sensing a movement of the user between two or more predetermined locations on or near a housing 312 of the home appliance 310. Sensing the presence of the user at the predetermined location may be done in any suitable manner including by sensing a touch made by the user on the home appliance 310. Sensing the touch may include sensing the touch on a predetermined portion of the home appliance such as adjacent one of more of the sensors 328. Sensing the presence of the user may alternatively include sensing the presence of an inanimate object indicative of a presence of the user. For example, this may include an RF chip (radio frequency chip) in a laundry basket or dish that is at the predetermined location.

At 404, movement of the door 318 from a closed position to an opened position may be automatically initiated by the controller 324 based on the sensing at 402. Movement of the door 318 at 404 may include partially moving the door 318 to an opened position or fully moving the door 318 to the opened position. As will be understood from the home appliances described above, the door may be moved to an opened position in any suitable manner including that initiating movement of the door from the closed position to the opened position may include pivoting the door vertically, pivoting the door horizontally, or vertically sliding the door.

It will be understood that the method of operating the laundry treating appliance may be flexible and that the method 400 illustrated is merely for illustrative purposes. For example, it is contemplated that the controller may also automatically move the door towards a closed position of the door. This may include sliding the door towards the closed position of the door or pivoting the door towards the closed position of the door. The moving the door towards a closed position may be in response to a user initiated stimulus or in response to it being determined that the user may no longer be at the predetermined location. It is also contemplated that the controller may receive an input signal from the user, such as through the user interface, and the automatic initiating of the movement of the door based thereon may be disabled.

FIG. 7A illustrates a hand 340 of a user that may be sensed at a predetermined location, which may be adjacent any of the sensors 328. Further, the user may make a gesture by moving their hand 340 in a direction indicated by the arrow 342. The two sensors 328 adjacent the upper left hand corner of the door 318 may sense the beginning movements of the hand 340 in a downward sweeping motion. This may prompt the controller 324 to begin to move the door 318 towards a partially opened position as illustrated in FIG. 7B. The user may continue to move their hand 340 along the path formed by the arrow 342 between the two sets of sensors 328. When the hand 340 finishes the gesture as illustrated in FIG. 7C, the hand 340 may be adjacent the two sensors 328 adjacent the lower right corner of the door 318. This may prompt the controller 324 to continue to move the door 318 downwards into a fully opened position. It is contemplated that the home appliance 310 may be configured such that if the user gestured their hand 340 in the opposite direction the door 318 may be automatically raised to the closed position.

It will be understood that the various sensors may be located at any suitable location on the home appliance in order to capture any suitable gesture. FIG. 8A illustrates yet another home appliance 510, which is similar to the home appliance 310 previously described and therefore, like parts will be identified with like numerals increased by 200, with it being understood that the description of the like parts of the home appliance 310 applies to the home appliance 510, unless otherwise noted. One difference is that the sensors 528 are located adjacent a left side of the door 518. In such an instance the user may make a gesture by moving their hand 540 in a direction indicated by the arrow 542. As the hand 540 is moved downwards along the sensors 528, the sensors 528 may output signals accordingly and the controller 524 may begin to move the door 518 downwards as illustrated in FIG. 8B. The controller 524 may continue to move the door 518 downward as the hand 540 moves downward until the door 518 is fully open as illustrated in FIG. 8C. The home appliance 510 may be configured such that if the user gestured their hand 540 in the opposite direction the door 518 may be automatically raised to the closed position. It may be understood that while a hand of the user has been described as being sensed a gesture utilizing another body part may alternatively be sensed.

The above embodiments provide a variety of benefits including that home appliances may be operated to automatically initiate movement of a door when a user is determined to be present near the home appliance. This may prove particularly useful when a user has his or her hands or arms loaded and may not be able to open the door to the home appliance. Further, the appliance may be touched to open the door and this may allow a user to bump the home appliance with a shoulder or foot to open the door. Such automatic opening of the door may increase user satisfaction by allowing the user to load the appliance without having to set down what they are carrying.

To the extent not already described, the different features and structures of the various embodiments may be used in combination with each other as desired. That one feature may not be illustrated in all of the embodiments is not meant to be construed that it may not be, but is done for brevity of description. Thus, the various features of the different embodiments may be mixed and matched as desired to form new embodiments, whether or not the new embodiments are expressly described. Further, while the above described embodiments have been described with respect to clothes washing machines the embodiments of the invention may be implemented in any suitable laundry treating appliance.

While the invention has been specifically described in connection with certain specific embodiments thereof, it is to be understood that this is by way of illustration and not of limitation. Reasonable variation and modification are possible within the scope of the forgoing disclosure and drawings without departing from the spirit of the invention which is defined in the appended claims.

What is claimed is:

1. A home appliance for treating an article according to an automatic cycle of operation, comprising:
   a treating chamber having an open face;
   a door for slidably closing the open face of the treating chamber in a vertical direction;
   two or more sensors vertically arranged on a housing of the home appliance proximate to the open face, at least a first of the two or more sensors disposed vertically above or vertically below a second of the two or more sensors, and wherein the two or more sensors are arranged spanning a vertical length of the open face;

an actuator operably coupled with the door to vertically move the door from a closed position of the door to an opened position of the door; and a controller for controlling operation of the home appliance and wherein the controller is configured to:

receive a first signal from the first of the two or more sensors;

receive a subsequent signal from the second of the two or more sensors;

determine that a predetermined gesture in a vertical direction has been made by a user based on the received signals; and actuate the actuator to slide the door vertically based on the determination that the predetermined gesture has been made.

2. The home appliance of claim 1 wherein the two or more sensors are horizontally offset.

3. The home appliance of claim 1 wherein the two or more sensors are arranged on a common portion of the housing horizontal to the door.

4. The home appliance of claim 1 wherein the actuator is a spring configured to move the door to the opened position including that of a partially opened position.

5. The home appliance of claim 1 wherein the actuator is a motor.

6. The home appliance of claim 5 wherein the motor is configured to move the door to the opened position where the door is fully open.

7. The home appliance of claim 5 wherein the motor is configured to move the door from the opened position to the closed position.

8. The home appliance of claim 7, further comprising a button operably coupled with the controller that when activated by the user initiates the automatic closing of the door by the motor.

9. The home appliance of claim 1 wherein the controller is configured to determine that the predetermined gesture has been made based on sensing a movement of the user between three or more predetermined locations.

10. The home appliance of claim 1 wherein at least the first of the two or more sensors is disposed vertically above the second of the two or more sensors.

11. The home appliance of claim 10 wherein the actuator is operably coupled with the door to vertically move the door from a higher closed position of the door to a lower opened position of the door.

12. The home appliance of claim 11 wherein the lower opened position of the door provides access to the open face.

13. The home appliance of claim 1 wherein at least the first of the two or more sensors is disposed vertically below the second of the two or more sensors.

14. The home appliance of claim 13 wherein the actuator is operably coupled with the door to vertically move the door from a lower closed position of the door to a higher opened position of the door.

15. The home appliance of claim 14 wherein the higher opened position of the door provides access to the open face.

16. The home appliance of claim 1 wherein the controller is further configured to partially actuate the actuator to slide the door vertically in matching motion of the predetermined gesture made by the user.

17. A home appliance for treating an article according to an automatic cycle of operation, comprising:

a user interface having physical interface elements;

a treating chamber having an open face;

a door for slidably closing the open face of the treating chamber in a vertical direction;

two or more sensors vertically arranged on a housing of the home appliance apart from the user interface, at least a first of the two or more sensors disposed vertically above or vertically below a second of the two or more sensors;

an actuator operably coupled with the door to vertically move the door from a closed position of the door to an opened position of the door; and a controller for controlling operation of the home appliance and wherein the controller is configured to:

receive a first signal from the first of the two or more sensors;

receive a subsequent signal from the second of the two or more sensors;

determine that a predetermined gesture in a vertical direction has been made by a user based on the received signals; and actuate the actuator to slide the door vertically.

18. The home appliance of claim 17 wherein the actuator is a motor.

19. The home appliance of claim 17 wherein the controller is configured to determine that the predetermined gesture has been made based on sensing a movement of the user between three or more predetermined locations.

20. The home appliance of claim 17 wherein the controller is further configured to partially actuate the actuator to slide the door vertically in matching motion of the predetermined gesture made by the user.

* * * * *